United States Patent [19]

White

[11] 4,356,697

[45] Nov. 2, 1982

[54] HEAT ENGINES

[76] Inventor: Eugene W. White, R.D. #2, Box 182, Rossiter, Pa. 15772

[21] Appl. No.: 181,790

[22] Filed: Aug. 27, 1980

[51] Int. Cl.[3] .................... F03G 7/06

[52] U.S. Cl. .................... 60/682; 60/516; 60/508; 417/52; 417/207; 417/379

[58] Field of Search .................... 60/508, 512, 516, 517, 60/519, 650, 682; 417/52, 207, 379

[56] References Cited

U.S. PATENT DOCUMENTS 3,732,040 5/1973 Low et al. .................... 60/531

FOREIGN PATENT DOCUMENTS 688689 9/1979 U.S.S.R. .................... 417/52

*Primary Examiner*—Allen M. Ostrager

*Attorney, Agent, or Firm*—Buell, Blenko, Ziesenheim & Beck

[57] ABSTRACT

A new heat engine is provided in the form of a pressure oscillation generation device having a chamber with two spaced apart walls, means on the outside of one wall continuously heating said one wall, means on the other of said walls continuously cooling said other wall, a thermal shield movable between said walls, means alternating said thermal shield back and forth between said walls whereby a heat expansible fluid contained in said chamber is alternately heated and cooled thereby causing said fluid to undergo alternate expansions and contractions.

14 Claims, 7 Drawing Figures

Fig.5.
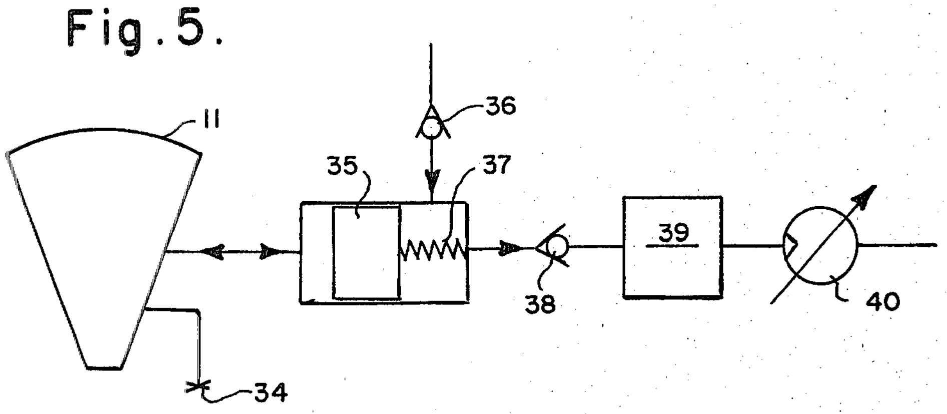
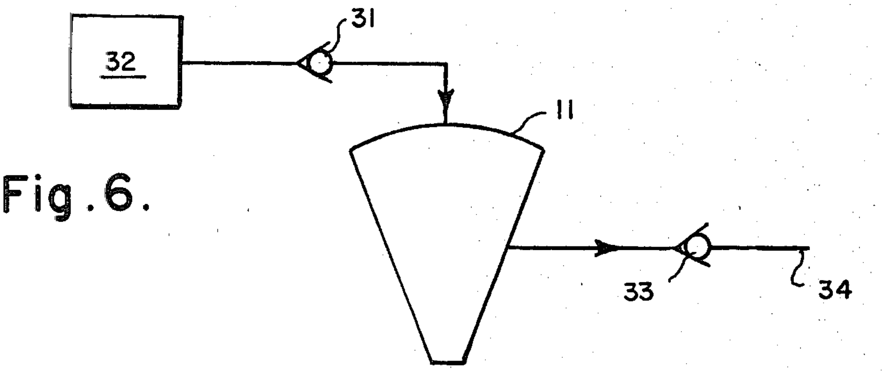
Fig.6.
Fig.7.
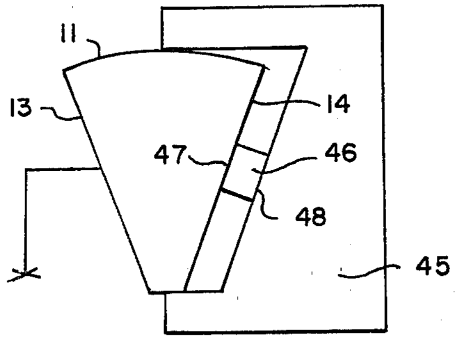

HEAT ENGINES

This invention relates to heat engines and particularly to an apparatus that converts heat energy into an oscillating gas pressure that is in turn converted into useful pneumatic, hydraulic, mechanical or electrical energy.

Heart engines of various sorts, such as the well known stirling engine, have heretofore been proposed for converting heat energy into mechanical energy. There have been dozens of patents issued on modifications of the stirling engine. The external combustion stirling engine and its various modifications have been displaced by internal combustion engines of the otto and diesel types and have been for years little more than a scientific curiosity.

Modern research and development of the stirling engine promises someday to result in a competitive alternative to internal combustion engines but they have become extremely complex mechanically and have lost much of the appeal of the simple old stirlings.

The hallmark of an external combustion engine is that it uses a continuously combusting flame and thus can be made to be virtually non polluting in contrast to the internal combustion engines that are sources of major air pollutants.

Conventional internal combustion engines are restricted to combusting fuels that are readily vaporized and that leave no fouling deposits. This tends to restrict fuel selection to the relatively clean-burning gasolines, fuel oils, alcohols and liquified gases such as propane. Gaseous products derived from wood and other solid carbonaceous fuels such as coal tend to quickly foul internal combustion engines necessitating frequent and costly maintenance procedures.

Conventional design and construction of heat engines including the stirling and internal combustion engines involve expensive machining of carefully designed components including pistons, bearings, cam shafts, valves, etc. High engineering and tooling costs to manufacture an automobile engine that has an expected life to overhaul of only about 2,000 to 3,000 running hours (up to 100,000 road miles) require the production of thousands of identical engines to be economically worthwile. Complexity of the modern internal combustion engine together with its required pollution control equipment have put its routine tuning beyond the capability of the vast majority of operators.

Conventional stirling engines work on a displacement principle wherein the engine's working gas is physically caused to move back and forth between the heated and the cooled portions of the engine thus the displacer occupies a considerable volume in the engine.

Conventional internal combustion engines discard $\frac{2}{3}$ of the heat energy derived from burning their fuel. Approximately $\frac{1}{3}$ of the heat is dissipated through the radiator and approximately $\frac{1}{3}$ of the heat escapes at a moderately high temperature in the exhaust gases.

This present invention relates to an apparatus in the form of a chamber wherein one wall is continuously heated on the outside by a steady heat source, one wall is continuously cooled on the outside, and inside the chamber a thermal shield is made to alternate between the hot and cool inner surfaces such that pressure of the contained gas increases and decreases in response to the alternate heating and cooling of the contained gas.

It is an important object of the invention to provide an apparatus and process constituting an external heat source engine that has as its basic feature a chamber containing at least one externally heated and one externally cooled wall and inside which a thermal shield is caused to alternate between the corresponding two surfaces to subject the contained gas to fluctuations in temperature thereby causing the pressure of the gas to also fluctuate (oscillate).

It is also an object of this invention to provide an apparatus that can be quite simply understood and maintained by most users and that is manufactured to generous tolerances by simple tooling.

It is another object of this invention to have the apparatus function as an air compressor by providing an inlet and an outlet port to the chamber The inlet port opening to ambient air is check-valved to prevent pressurized air from leaving the chamber but allows air to enter the chamber when its internal pressure is less than atmospheric. The outlet port is connected to a ballast or storage tank and is check-valved to permit compressed air to pass when the chamber pressure exceeds that of the storage or ballast tank.

It is also an objective of the invention to use the compressed air from the ballast or storage tank to drive any kind of air motor or turbine device for the purpose of generating electrical power or to power any available air driven tool or machine.

It is also an object of the invention to use more than one compression stage wherein the output from one device becomes the input to another device thus multiplying pressure of the compressed air.

It is also an objective of the invention to pressurize the chamber so that the apparatus will generate large pressure differentials for the purpose of driving power stroke pistons.

It is also an objective of the invention to pressurize the chamber and have the cold wall constructed of a flexible material such that it will flex in response to the internal pressure oscillations thereby transmitting the oscillating pressure to an externally clamped piezoelectric device for the purpose of directly generating an alternating electrical current or voltage.

It is also an important object of the invention to provide an apparatus that can use a wide variety of heat sources that include but are not limited to sunlite, exhaust heat from internal combustion engines; hot products of combustion from wood, charcoal, coal, fuel oil, gasoline, alcohol or straw flames.

It is also an object of the invention to remove heat from the cooled surface by means of ambient air, circulated water, refrigerant or other means.

It is also an object of the invention to construct the pressure oscillation generator apparatus in a wide variety of shapes and sizes. In some applications the device can be so shaped that it becomes a structural member such as a hollow frame or fender.

Finally it is an object of the invention to have the thermal shield function as a heat exchanger to increase the thermal efficiency of the device.

These and other important objects and advantages of my invention will be apparent from the following description taken in connection with the accompanying drawings in which:

FIG. 5 is a schematic view of a pressure oscillation generator according to this invention used to drive a hydraulic or pneumatic piston pump;

FIG. 6 is a schematic view of the pressure oscillation generator of this invention used to generate a reduced pressure or modest vacuum; and FIG. 7 is a schematic view of a pressure oscillation generator according to this invention used for direct production of alternating electrical current using clamped-on piezoelectric.

Figure 1:
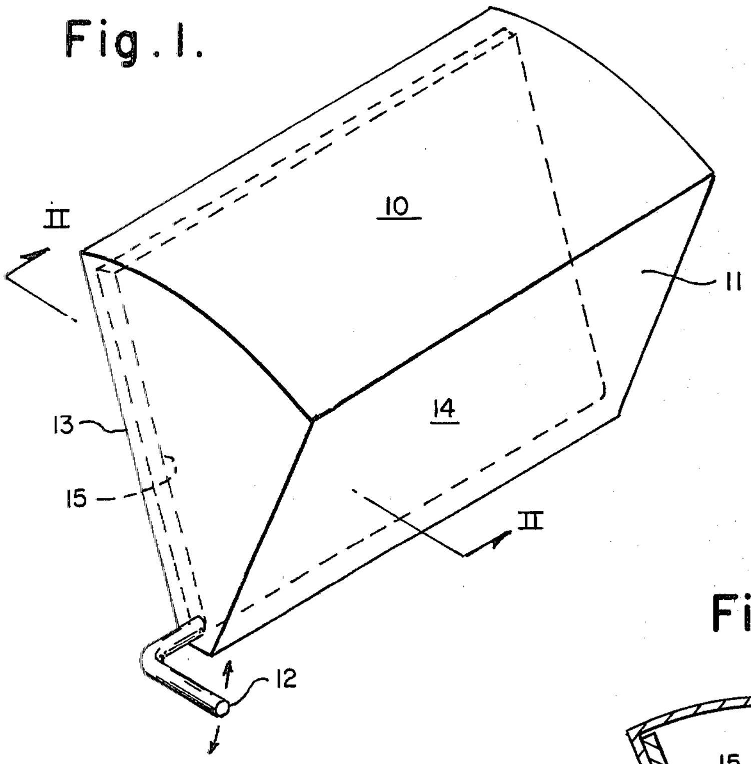
FIG. 1 is an isometric schematic view of a pressure oscillation generator according to this invention.
Figure 2:
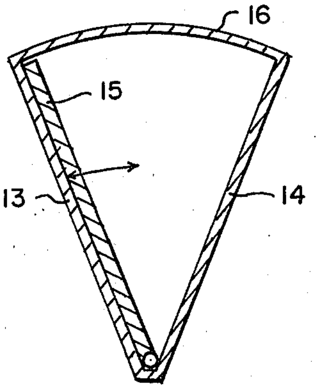
FIG. 2 is a cross sectional view of the apparatus of FIG. 1 on the line II—II thereof.

Referring to the drawings and particularly to FIGS. 1 and 2, I have illustrated a pressure oscillation generator 10 which consists of a closed chamber 11 enclosing the thermal shield 15 that is caused to move back and forth between a heated wall 13 and a cooled wall 14. The thermal shield is externally actuated by means of an arm 12. Such activation can be accomplished a number of ways including an electrical solenoid, an air piston, a revolving cam, etc. Heat energy impinges on the heated wall 13 thus causing the inside of the wall to also become heated by means of conduction. The preferred mode of heating wall 13 is by means of wood heat wherein wall 13 is incorporated as a fire wall in a wood burning stove. Wall 14 is cooled on the outside surface to remove heat energy from the chamber 11. In the preferred mode, cooling is accomplished by circulated room air either by simple convection air currents or by forced air circulation thereby using a living space as the heat sink. When the thermal shield is against the hot surface 13 air or gas in the chamber is minimally affected by heat from this wall and the cooling effect of the cool wall 14 is dominant causing the temperature of the enclosed gas to drop thereby reducing the pressure of the gas in accordance with the well known gas law behavior. The heat shield is now changed to the cold wall position and the enclosed gas is now exposed to the effect of the heated surface and at the same time is shielded from the cool surface. As a result, the pressure of the gas increases. With a change in temperature from 0° C. when the gas is cooled to 273° C. when heated, the pressure of the gas in the chamber would double.

To increase the effectiveness of the pressure oscillation generator, portions of the chamber may be insulated. Thus, in the preferred mode the inner top 16 portion of the chamber and the two end walls would be thermally insulated.

Figure 3:
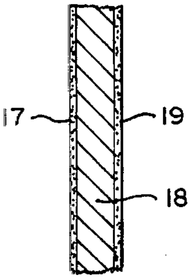
FIG. 3 is a fragmentary enlarged cross section view of the thermal shield.

The thermal shield 15 can be fabricated a number of ways. FIG. 3 illustrated the preferred fabrication wherein a sandwich type construction is used. A light weight refractory insulating material 18 is used to retard heat transfer across the thermal shield 15 and thin metal sheets 17 and 19 clad the surface of the insulator 18. The metal sheets function to both protect the insulator from mechanical damage and also function as heat exchangers in the following way. During each cool-down part of the cycle, the thermal shield dwells against the heated chamber wall 13. During the dwell time the metal surface of the thermal shield 17 is heated somewhat by its close proximity to 13. When the thermal shield 15 is returned to the cooled wall 14 position, gas in the chamber is not only heated by exposure to the hot wall 13 but also by exposure to thermal shield wall 17. An analagous roll is played by the cool side 19 of the thermal shield. Achievement of an effective temperature difference between the two surfaces 17 and 19 is dependent on selection of optimum insulator material and thickness at 18.

For a given size chamber 11, thermal efficiences and mechanical stiffness is enhanced by corrugating the walls 13 and 14. The two walls need not be identical corrugated or shaped but it is intended that the corresponding thermal shield surface would be fashioned to closely match the corresponding chamber wall. Thus if hot wall 13 is corrugated, thermal shield surface 17 should be also corrugated to nest against 13.

Movement of the thermal shield 15 through the gas enclosed in the chamber 11 serves to mechanically mix or stir the gas for efficient thermal transfer. Gas in the chamber will have a cushioning or "dash-pot" effect on the thermal shield as it rapidly approaches the chamber walls thus cushioning the thermal shield from mechanical damage. The dashpot effect can be controlled by selection of the thermal shield's 15 clearances with respect to the top 16 and end walls of the chamber.

The pressure oscillation generator 11 of this invention is illustrated by itself in FIG. 1. It can be used to generate useful energy in a variety of ways. The various figures of the drawings are intended to illustrate just four basically different kinds of uses realizing that many other variations are practical and desirable.

Figure 4:
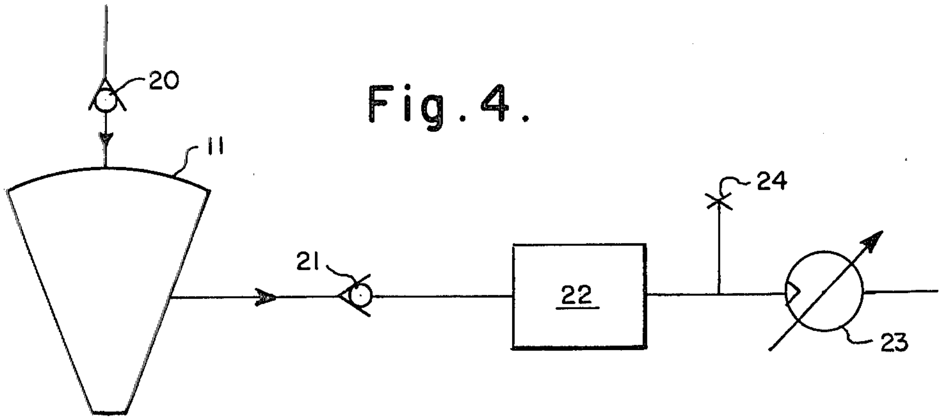
FIG. 4 is a schematic view of the apparatus of FIG. 1 used as an air compressor.

FIG. 4 illustrates a preferred embodiment of the invention as an air compressor. The pressure oscillation generating device is equipped with a check-valved inlet port 20 and a check-valved outlet port 21. Air passes check valve 20 into chamber during cooling part of cycle when pressure in chamber is below atmospheric. During heating part of cycle when pressure in chamber 11 exceeds that of ballast tank 22 exhaust check vlve 21 opens to allow air to exit chamber 11. In this preferred mode, an air motor is driven by the pressurized air in ballast tank 22. The air motor 23 can be used to power an electrical generator or any other useful device. Depending on the nature of the heat source, pressures in ballast tank 22 may not be large enough for available air motors. Thus a second stage may be added by simply having the inlet port 20 connect to a first stage at point 24 and using an air motor 23 on the second stage output only.

A second embodiment of this invention is to use the pressure oscillation generator device to power a piston as shown schematically in FIG. 5. In this embodiment, the pressure oscillation generator 11 communicates its pressure oscillations to one end of a power piston to operate it in a push-pull mode. Using the test station 34 pressure in the chamber 11 is raised consistent with the strength of materials used in its construction. If for example the chamber is pressurized to 1500 psi compared with only the 15 psi atmospheric pressure in FIG 4, raising the pressure from 0° C. to 273° will increase the pressure in the chamber from 1500 psi to 3000 psi or a pressure gain of 1500 psi versus only 15 psi in FIG. 4 situation. Because pressure in the chamber will not return to zero (the chamber is deliberated pressurized to a baseline of 1500 psi) the power piston 35 must be "spring loaded" with spring 37 to overcome return friction and the baseline pressure in the chamber. During the heating part of the cycle the pressure rises above 1500 psi driving the piston 35 to the right. Check valves 36 and 38 insure a pump action flow of either the air or hydraulic fluid. Output pressure from an air ballast tank 39 or hydraulic pressure accumulator 39 is used to operate air or hydraulic motors 40 in conventional applications.

FIG. 6 illustrates the use of the basic pressure oscillation generator device to draw a modest vacuum. As in FIG. 4 the pressure oscillation generator is equipped with check valved inlet and outlet ports. However in the vacuum application the inlet port 31 connects to the chamber 32 that is to be evacuated and the outlet port 33 vents to atmosphere 34.

A closely related application of this device would be to have it pump virtually any kind of gas from a source at 32 to its destination at 34.

Another preferred embodiment of this invention is to use the pressure oscillation generator device to drive a directly coupled piezoelectric device for the purpose of generating alternating electrical current or voltage. FIG. 7 illustrates this configuration wherein a mechanically rigid yoke 45 is attached to the chamber 11. Sandwiched between the cold wall and the yoke is a piezoelectric 46 such as PZT. Electrical leads 47 and 48 attach to the electroded surfaces of the piezoelectric. The cold wall 14 is constructed of a less rigid material than the hot wall 13 and other parts of the chamber 11. The chamber is pressurized to some baseline operating pressure introducing pressure through 24—say 1500 psi. As the thermal shield is oscillated in the chamber, pressure oscillations will be transmitted to the piezoelectric by flexures of the cold wall 14.

One of the most interesting application of the pressure oscillation generator of this invention is as a means to convert low grade (small $\Delta T$'s) thermal sources into practical power generators. As a rule, the lower the $\Delta T$ the smaller will be the $\Delta p$'s generated thus structural strength requirements are relaxed and the apparatus can be built to large scale with inexpensive materials. The preferred embodiment of this concept is to build the pressure oscillation generator in the form of a large flat plate solar collector used to pump high volumes of air at modest pressure (0.1 to 2 psi). Such a device will be useful for circulating air through other flat plate collectors and buildings. Also, low pressure air turbines can generate useful electrical energy cheaply.

In the foregoing specification I have set out certain preferred practices and embodiments of this invention, however, it will be understood that this invention may be otherwise embodied within the scope of the following claims.

I claim:

1. A pressure oscillation generation device comprising a chamber having two spaced apart walls, means on the outside of one wall continuously heating said one wall, means on the other of said walls continuously cooling said other wall, a thermal shield movable between said walls, means alternating said thermal shield back and forth between said walls whereby a gas contained in said chamber is alternately heated and cooled thereby causing said gas to undergo alternate expansion and contraction.

2. An apparatus as claimed in claim 1 wherein a cylinder communicates at one end with said chamber, a spring loaded power piston is movable in said cylinder and is urged toward said one end of the cylinder by said spring whereby said piston is alternately moved from said one end against the spring loading when the gas is heated and returned by said spring when the gas is cooled.

3. An apparatus as claimed in claim 1 having a check valve inlet port and a check valve outlet port communicating with said chamber whereby gas is drawn into the chamber during the cooling of the gas in said chamber and discharged under pressure during the heating of the gas in said chamber to provide a source of compressed gas under pressure.

4. The apparatus as claimed in claim 1 or 3 wherein a gas turbine is connected to said chamber and supplied with pressurized gas therefrom to drive said turbine, and an electric generator connected to said turbine and driven thereby.

5. An apparatus as claimed in claim 4 having an accumulator between said chamber and said turbine.

6. An apparatus as claimed in claim 2 wherein said cylinder is provided at the said other end with a fluid inlet port and a fluid outlet port, check valve means in each of said fluid inlet and fluid outlet ports, said inlet port being connected to a source of fluid whereby said fluid is alternately drawn into said chamber and discharged from said chamber under pressure.

7. An apparatus as claimed in claim 6 wherein a gas turbine is connected to the outlet port of said cylinder and driven by pressurized gas therefrom, and an electric generator connected to said turbine and driven thereby.

8. An apparatus as claimed in claim 7 having an accumulator between said cylinder outlet port and said turbine.

9. An apparatus as claimed in claim 1 or 2 or 3 or 4 or 6 or 7 or 8 wherein the fluid is a gas.

10. An apparatus as claimed in claim 1 or 2 or 3 or 4 or 6 or 7 or 8 wherein the fluid is air.

11. An apparatus as claimed in claim 1 or 3 having outlet means connected to a fluid operated tool.

12. An apparatus as claimed in claim 1 having a check valve inlet port and a check valve outlet port communicating with said chamber, said check valve inlet port being connected to an adjacent vessel to be evacuated whereby fluid is drawn from said adjacent vessel through the inlet port during cooling of fluid in the chamber and discharged to atmosphere through the outlet port during the heating of fluid in the chamber.

13. An apparatus as claimed claim 1 wherein the chamber is filled with gas under pressure and the cooled wall is flexible, a piezoelectric device fixed to said cooled wall such that pressure oscillations in the chamber are transmitted through the flexible wall to said piezoelectric device causing alternating electric current to be generated.

14. An apparatus as claimed in claim 1 in the form of a flat plate solar collector wherein the one wall is transparent and directed toward the sun and the face of the thermal shield toward said one wall is a black heat absorbing surface.

* * * * *

UNITED STATES PATENT AND TRADEMARK OFFICE
CERTIFICATE OF CORRECTION

PATENT NO. : 4,356,697

DATED : November 2, 1982

INVENTOR(S) : EUGENE W. WHITE

It is certified that error appears in the above-identified patent and that said Letters Patent are hereby corrected as shown below:

Column 1, line 5, --continuous-- should be inserted after "converts".

Column 1, line 8, "Heart" should read --Heat--.

Column 4, line 33, "vlve 21" should read --valve 21--.

Signed and Sealed this

*Eighth* Day of *March 1983*

[SEAL]

*Attest:*

GERALD J. MOSSINGHOFF

*Attesting Officer* *Commissioner of Patents and Trademarks*